United States Patent Office 3,203,954
Patented Aug. 31, 1965

3,203,954
NOVEL 3,5-DISUBSTITUTED-1,2,6-(2H)-THIADIAZINE-1,1-DIOXIDES
John B. Wright, Kalamazoo Township, Kalamazoo County, Mich., assignor to The Upjohn Company, Kalamazoo, Mich., a corporation of Delaware
No Drawing. Filed July 15, 1963, Ser. No. 295,192
12 Claims. (Cl. 260—243)

This invention pertains to novel organic chemical compounds and to a novel process for preparing the same. More particularly, the invention is directed to 3,5-disubstituted-1,2,6-(2H)-thiadiazine - 1,1 - dioxides, and to a novel process which comprises condensing sulfamide or an alkylsulfamide with an $\alpha,\gamma$-diketone.

The novel compounds of the invention have the following structural formula

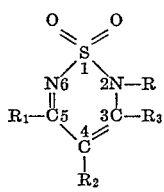

(I)

wherein R is selected from the group consisting of hydrogen and lower-alkyl; $R_1$ is selected from the group consisting of phenyl, methylphenyl, halophenyl, lower-alkoxyphenyl, pyridyl, benzyl, and phenethyl; $R_2$ is selected from the group consisting of hydrogen and carbalkoxy; and $R_3$ is selected from the group consisting of lower-alkyl, phenyl, methylphenyl, halophenyl, lower-alkoxyphenyl, pyridyl, benzyl, and phenethyl.

As used in this specification, the term "lower-alkyl" means an alkyl group of from 1 to 4 carbon atoms, inclusive, i.e., methyl, ethyl, propyl, butyl, and isomeric forms thereof; the term "halophenyl" means halogen-substituted phenyl wherein the halogen is selected from chlorine, bromine, iodine, and fluorine; the term "lower-alkoxyphenyl" means phenyl substituted with an alkoxy group of from 1 to 4 carbon atoms, inclusive, i.e., methoxyphenyl, ethoxyphenyl, propoxyphenyl, butoxyphenyl, and isomeric forms thereof; and the term "carbalkoxy" means a carbonyl group having attached thereto an alkoxy group of from 1 to 4 carbon atoms, inclusive, as above.

In accordance with this invention, it has now been found that 3,5-disubstituted-1,2,6-(2H)-thiadiazine - 1,1-dioxides having the Formula I above are useful as intermediates for reaction with chlorine to produce active-chlorine compounds. Thus for example, the compounds of Formula I wherein R is hydrogen can be reacted with chlorine to produce active-chlorine compounds in which the N-attached hydrogen atom at position 2 is replaced by a chlorine atom. Furthermore, the compounds of Formula I can be catalytically hydrogenated in the presence of a hydrogenation catalyst, e.g., platinum or palladium, to obtain the corresponding 3,5-disubstituted-tetrahydro-1,2,6-(2H)-thiadiazine - 1,1 - dioxides of the formula

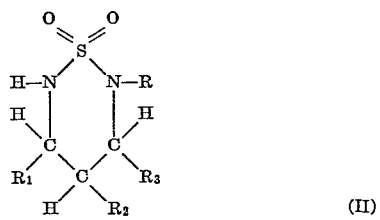

(II)

wherein R, $R_1$, $R_2$, and $R_3$ are as defined above. The compounds of Formula II are then reacted with chlorine to produce active-chlorine compounds in which one or two N-attached hydrogen atoms are replaced by chlorine. The degree of chlorination (whether one or two atoms of chlorine) depends upon the identity of R (whether hydrogen or lower-alkyl) as well as whether chlorination is effected with one molecular equivalent of chlorine or with two molecular equivalents. The aforesaid active-chlorine compounds are useful as disinfectants, bleaching agents, and antiseptics.

Further in accordance with the invention, it has now been found that the compounds of Formula I possess useful pharmacologic and therapeutic utilities. Illustratively, 3,5-di-(p-tolyl)-1,2,6 - (2H) - thiadiazine-1,1-dioxide possesses local anti-inflammatory activity. Hence, the compounds of the invention can be used for treating cuts, burns, abrasions, and contusions in mammals, birds, and other animals.

The novel compounds of Formula I are prepared by condensing a sulfamide of the formula

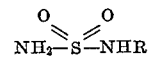

wherein R is as defined above, with an $\alpha,\gamma$-diketone of the formula

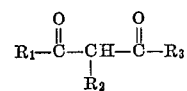

(III)

wherein $R_1$, $R_2$, and $R_3$ are as defined above. The reactants are mixed in the presence of an inert organic solvent and acid catalyst. Suitable inert organic solvents include methanol, ethanol, isopropyl alcohol, ethanol and water, dioxane, dimethylformamide, dioxane and water, dimethylformamide and water, and the like. Suitable acid catalysts include, for example, hydrogen chloride, sulfuric acid, p-toluenesulfonic acid, hydrogen bromide, and the like. The reaction proceeds satisfactorily at temperature ranging from about 20° C. up to about 100° C., and, advantageously, the reaction mixture is heated at a temperature in the range of about 60° C. up to about 100° C. in order to assure completion of the reaction in a convenient interval of time. The 3,5-disubstituted-1,2,6-(2H)-thiadiazine-1,1-dioxide thus produced is separated from the reaction mixture and recovered in pure form by conventional procedures such as filtration, solvent evaporation, solvent extraction, and crystallization.

Alternatively, the novel compounds of Formula I wherein R is lower-alkyl can be conveniently prepared by condensing sulfamide with an $\alpha,\gamma$-diketone of Formula III and reacting the thus-produced 3,5-disubstituted-1,2,6-(2H)-thiadiazine-1,1-dioxide (compound according to Formula I wherein R is hydrogen) with a diazolalkane, e.g., diazomethane, diazoethane, diazopropane, and diazobutane, to produce the corresponding 2-lower-alkyl-3,5-disubstituted-1,2,6-(2H)-thiadiazine-1,1-dioxide. The reaction of a 3,5-disubstituted-1,2,6-(2H)-thiadiazine - 1,1-dioxide with a diazoalkane (preferably an ethereal solution thereof) is conveniently effected at temperatures ranging between about 10° C. and about 30° C. in the presence of an inert solvent such as methylene chloride, chloroform, carbon tetrachloride, and the like.

The $\alpha,\gamma$-diketone starting compounds having the Formula III are generally known in the art and can be prepared by known methods. Illustrative known $\alpha,\gamma$-diketones include 1,3-diphenyl-1,3-propanedione,
1,3-di-(p-tolyl)-1,3-propanedione, 1,3-di-(m-chlorophenyl)-1,3-propanedione,
1,3-di-(p-chlorophenyl)-1,3-propanedione,
1,3-di-(p-methoxyphenyl)-1,3-propanedione,
1-(p-bromophenyl)-3-(p-methoxyphenyl)-1,3-propanedione,
1-(p-bromophenyl)-3-phenyl-1,3-propanedione,
1,3-di-(p-bromophenyl)-1,3-propanedione,
1-(m-chlorophenyl)-3-phenyl-1,3-propanedione,
1-(o-chlorophenyl)-3-phenyl-1,3-propanedione,
1,3-di-(3-pyridyl)-1,3-propanedione,
1-(m-methoxyphenyl)-3-phenyl-1,3-propanedione,
1-(o-methoxyphenyl)-3-phenyl-1,3-propanedione,
1-(p-methoxyphenyl)-3-phenyl-1,3-propanedione,
1-phenyl-3-(2-pyridyl)-1,3-propanedione,
1-phenyl-3-(3-pyridyl)-1,3-propanedione,
1-phenyl-3-(4-pyridyl)-1,3-propanedione,
1-phenyl-3-(m-tolyl)-1,3-propanedione,
1-phenyl-3-(o-tolyl)-1,3-propanedione,
1-phenyl-3-(p-tolyl)-1,3-propanedione,
1-(p-bromophenyl)-4-phenyl-1,3-butadiene,
1-(p-butoxyphenyl)-1,3-butanedione,
1-(p-chlorophenyl)-1,3-butanedione,
1,4-diphenyl-1,3-butanedione,
1-(p-ethoxyphenyl)-1,3-butanedione,
1-(p-isobutoxyphenyl)-1,3-butanedione,
1-(p-isopropoxyphenyl)-1,3-butanedione,
1-(o-methoxyphenyl)-1,3-butanedione,
1-(p-methoxyphenyl)-1,3-butanedione,
1-phenyl-1,3-butanedione,
1-(p-propoxyphenyl)-1,3-butanedione,
1-(2-pyridyl)-1,3-butanedione,
1-(3-pyridyl)-1,3-butanedione,
1-(4-pyridyl)-1,3-butanedione,
1-(p-tolyl)-1,3-butanedione,
1-phenyl-2,4-pentanedione,
5,5-dimethyl-1-phenyl-2,4-hexanedione,
1-phenyl-2,4-hexanedione,
6-phenyl-2,4-hexanedione,
1,6-diphenyl-2,4-hexanedione,
6-methyl-1-phenyl-2,4-heptanedione, and
ethyl benzoylacetoacetate.

The following examples are illustrative of the process and products of the present invention, but are not to be construed as limiting.

EXAMPLE 1.—PREPARATION OF 3,5-DIPHENYL-1,2,6-(2H)-THIADIAZINE-1,1-DIOXIDE

After bubbling dry hydrogen chloride gas into a mixture consisting of 4.8 g. (0.05 mole) of sulfamide, 11.21 g. (0.05 mole) of 1,3-diphenyl-1,3-propanedione, and 40 ml. of anhydrous ethanol for about 15 minutes, the reaction mixture was heated at 60° C. for 3 hours. Heating at the reflux temperature was continued for one hour, and after cooling, the mixture was filtered. The filtrate was evaporated to dryness under reduced pressure. The solid residue thus obtained was added to the solid on the filter, the combined solids were triturated with ether, and the mixture was filtered. Trituration with ether and filtration were repeated several times. The filter cake from the last filtration was triturated with water and filtered several times. The filter cake from the last filtration was recrystallized from ethanol. Crystals of 3,5-diphenyl-1,2,6-(2H)-thiadiazine-1,1-dioxide were obtained as colorless prisms which melted at 278° to 279° C.

*Analysis.*—Calcd. for $C_{15}H_{12}N_2O_2S$: C, 63.36; H, 4.26; N, 9.85; S, 11.28. Found: C, 63.09; H, 4.00; N, 9.36; S, 11.30.

EXAMPLE 2.—PREPARATION OF 3,5-DI-(p-TOLYL)-1,2,6-(2H)-THIADIAZINE-1,1-DIOXIDE

*Part A.—1,3-di-(p-tolyl)-1,3-propanedione*

To a mixture consisting of 23.4 g. (0.6 mole) of sodium amide and 300 ml. of anhydrous ether was added slowly with stirring, over a period of 10 minutes, 40.26 g. (0.3 mole) of p-methylacetophenone dissolved in 50 ml. of anhydrous ether. Stirring of this mixture was continued for 5 minutes before a solution consitsing of 90.12 g. (0.6 mole) of methyl p-toluate in 50 ml. of anhydrous ether was added slowly with stirring during an interval of 10 minutes. The reaction mixture was heated at the reflux temperature with stirring for 2 hrs., and then set aside for about 48 hrs. After diluting with 350 ml. of water, the mixture was neutralized with about 2 N hydrochloric acid. The neutralized mixture was then extracted with four 200-ml. portions of ether. The combined extracts were concentrated, and the residue thus obtained was recrystallized from 250 ml. of 95% ethanol. There was thus obtained 40.3 g. (53.2% yield) of 1,3-di-p-tolyl)-1,3-propanedione as yellowish needles melting at 123° to 125° C. A sample recrystallized a second time from 95% ethanol had a melting point of 125° to 127° C.

*Part B.—3,5-di-(p-tolyl)-1,1,6-(2H-thiadiazine-1,1-dioxide*

After bubbling dry hydrogen chloride gas into a mixture consisting of 4.8 g. (0.05 mole) of sulfamide, 12.62 g. (0.05 mole) of 1,3-di-(p-tolyl)-1,3-propanedione (Part A, above), and 40 ml. of anhydrous ethanol, the reaction mixture was heated to a temperature of about 60° C. An additional 60 ml. of ethanol was added and dry hydrogen chloride gas was again bubbled into the mixture. After continued heating at 60° C. for 3 hours, the reaction mixture was heated at the reflux temperature for one hour and cooled to about 25° C. The ethanol was removed by evaporation, and the residue thus obtained was triturated with ether and recovered on a filter. The filter cake was triturated throughly with water, and the solids were again recovered on a filter. The melting point was 287° to 289° C. Upon recrystallization from dioxane (with an acetone wash) there was obtained 3,5-di-(p-tolyl)-1,2,6-(2H)-thiadiazine-1,1-dioxide as yellowish-green needles melting at 288° to 290° C.

*Analysis.*—Calcd. for $C_{17}H_{16}N_2O_2S$: C, 65.36; H, 5.16; N, 8.97; S, 10.26. Found: C, 65.43; H, 5.01; N, 8.59; S, 10.08.

EXAMPLE 3.—PREPARATION OF 3-METHYL-5-BENZYL-1,2,6-(2H)-THIADIAZINE-1,1-DIOXIDE

A mixture consisting of 8.36 g. (0.048 mole) of 1-phenyl-2,4-pentanedione, 4.56 g. (0.048 mole) of sulfamide, and 40 ml. of anhydrous ethanol was treated with anhydrous hydrogen chloride gas for 1 minute. The reaction mixture was heated for 3 hours over a water bath held at 80° C. The solution thus produced was concentrated under reduced pressure over the water bath and the oily residue thus obtained was dissolved in a mixture of ether and water. The ether layer was separated and the aqueous layer was extracted with ether. The ether layer was again separated, and the combined ether extracts were dried over anhydrous magnesium sulfate. After removing the ether by evaporation, the residual oil was seeded with crystals obtained by evaporating to dryness a small sample of the original ether extract. Crystals formed, and there was thus obtained 10.01 g. of oily crystals melting at 62° to 68° C. Upon recrystallization from a mixture of benezene and cyclohexane in proportions of 3:1 there was obtained 7.66 g. (68.4% yield) of 3-methyl-5-benzyl-1,2,6-(2H)-thiadiazine-1,1-dioxide as tan prisms melting at 67° to 70° C. A further recrystallization from a mixture of benzene and cyclohexane in proportions of 4:1 gave prismatic crystals melting at 67° to 69° C.

*Analysis*—Calcd. for $C_{11}H_{12}N_2O_2S$: C, 55.91; H, 5.12; N, 11.86; S, 13.57. Found: C, 56.01; H, 4.94; N, 11.54; S, 13.47.

EXAMPLE 4.—PREPARATION OF 3-METHYL-5-(4-PYRIDYL)-1,2,6-(2H)-THIADIAZINE-1,1-DIOXIDE

A solution of 8.15 g. (0.05 mole) of isonicotinoylacetone [1-(4-pyridyl)-1,3-butanedione] and 4.8 g. (0.05 mole) of sulfamide in 50 ml. of absolute ethanol was vigorously stirred while anhydrous hydrogen chloride gas was introduced. The temperature of the reaction mixture increased to 60° C. After an additional 50 ml. of absolute ethanol was added the mixture was heated at the reflux temperature for 3 hours and then concentrated under reduced pressure. The concentrate was diluted with benzene, and the benzene was removed by evaporation. The yellow solid thus obtained was recrystallized from 97.5% ethanol to give crude product as yellow needles melting at 245° C. (with dec.). Recrystallization of the yellow needles from water gave 4.35 g. of 3-methyl-5-(4-pyridyl)-1,2,6-(2H) - thiadiazine-1,1-dioxide as yellow prisms melting at 286° C. (with dec.). A second recrystallization from water gave yellow prisms melting at 291° C. (with dec.).

*Analysis.*—Calcd. for $C_9H_9N_3O_2S$: C, 48.40; H, 4.06; N, 18.85; S, 14.40. Found: C, 48.08; H, 3.75; N, 18.48; S, 14.37.

EXAMPLE 5.—PREPARATION OF 3-METHYL-5-(3-PYRIDYL)-1,2,6-(2H)-THIADIAZINE-1,1-DIOXIDE

Part A.—Nicotinoylacetone [1-(3-pyridyl)-1,3-butanedione]

A suspension of 21.5 g. (0.55 mole) of sodium amide in 150 ml. of dry benzene was vigorously mixed, during an interval of 30 min., with a solution of 75.58 g. (0.5 mole) of ethyl nicotinate in 100 ml. of acetone. An exothermic reaction resulted, but the temperature of the reaction mixture was kept less than 50° C. by cooling. The reaction mixture became viscous; it was diluted with 100 ml. of dry benzene, stirred for 2 hrs., and filtered. The filter cake was mixed with 250 ml. of a mixture of ice and water, and the ice-water mixture was acidified with 33 g. (0.55 mole) of acetic acid. The acidified mixture was stirred for 15 min. and extracted with benzene. The extract was added to the original benzene filtrate and the solution was treated with magnesium silicate (Magnesol) and concentrated under reduced pressure. There was thus obtained 28.1 g. of an oily solid. Recrystallization of the solid from technical hexane (Skellysolve B, essentially a mixture of isomeric hexanes having a boiling range of 140° to 160° Fahrenheit) yielded 12.37 g. of nicotinoylacetone as yellowish prisms melting at 77.5° to 80° C. Two further recrystallizations from Skellysolve B produced yellowish prisms melting at 80° to 81° C.

*Analysis.*—Calcd. for $C_9H_9NO_2$: C, 66.24; H, 5.56; N, 8.58. Found C, 66.70; H, 5.71; N, 8.69.

Part B.—3-methyl-5-(3-pyridyl)-1,2,6-(2H)-thiadiazine-1,1-dioxide

A mixture consisting of 4.25 g. (0.026 mole) of nicotinoylacetone (Part A, above), 2.72 g. (0.026 mole) of sulfamide, and 25 ml. of absolute ethanol was vigorously stirred while being treated with anhydrous hydrogen chloride gas. Introduction of the gas was continued until the temperature of the reaction mixture had increased to 50° C. After an additional 25 ml. of absolute ethanol was added, the resulting viscous mixture was heated and stirred at the reflux temperature for 3 hours. The reaction mixture was cooled and filtered, and the filter cake was washed with ethanol. There was thus obtained crude 3-methyl-5-(3-pyridyl)-1,2,6-(2H)-thiadiazine-1,1-dioxide as the hydrochloride, in the form of a yellow solid melting at 273° C. (with dec.). Recrystallization from methanol containing a small amount of water gave 3.22 g. of yellow prisms melting at 276° C. (with dec.).

*Analysis.*—Calcd. for $C_9H_9N_3O_2S \cdot HCl$: C, 41.62; H, 3.88; Cl, 13.65; N, 16.18; S, 12.35. Found: C, 42.30; H, 3.43; Cl, 13.48; N, 1587; S, 11.85.

EXAMPLE 6.—PREPARATION OF ETHYL 3-METHYL - 5 - PHENYL - 1,2,6-(2H)-THIADIAZINE-1,1-DIOXIDE-4-CARBOXYLATE

A mixture consisting of 11.7 g. (0.05 mole) of ethyl benzoylacetoacetate [Organic Syntheses, Collective vol. II, p. 266, John Wiley & Sons, Inc., New York (1943)], 4.8 g. (0.05 mole) of sulfamide, and 50 ml. of absolute ethanol was vigorously stirred while being treated with anhydrous hydrogen chloride gas. The gas was bubbled into the mixture until the temperature had increased to 50° C. Heating of the reaction mixture at the reflux temperature was continued for 3 hours. After cooling, the reaction mixture was filtered, and the filtrate was concentrated under reduced pressure. The residue thus obtained was dissolved in a mixture of ether and water. After thorough mixing, the organic layer was separated, dried, and concentrated under reduced pressure. Part of the oily residue thus obtained crystallized on standing, and the crystals were recovered by filtration. The tan prisms thus obtained had a melting point of 114° to 130° C. After two recrystallizations from benzene, there was obtained 2.01 g. of ethyl 3-methyl-5-phenyl-1,2,6(2H)-thiadiazine-1,1-dioxide-4-carboxylate as slightly tan prisms melting at 142° to 143° C. A sample recrystallized a third time from benzene had a melting point of 143° to 144° C.

*Analysis.*—Calcd. for $C_{13}H_{14}N_2O_4S$: C, 53.05; H, 4.79; N, 9.52; S, 10.89. Found: C, 53.90; H, 4.98; N, 9.18; S, 10.71

Following the same procedure, but substituting methyl benzoylacetoacetate, propyl benzoylacetoacetate, and butyl benzoylacetoacetate for ethyl benzoylacetoacetate, there were prepared methyl, propyl, and butyl 3-methyl-5 - phenyl - 1,2,6 - (2H) - thiadiazine - 1,1 - dioxide-4-carboxylate, respectively.

EXAMPLE 7.—PREPARATION OF 2 - BUTYL - 3,5-DIPHENYL - 1,2,6 - (2H) - THIADIAZINE - 1,1-DIOXIDE

A mixture consisting of 6.88 g. (0.03 mole) of 1,3-diphenyl-1,3-propanedione, 4.66 g. (0.03 mole) of butylsulfamide, and 30 ml. of absolute ethanol was vigorously stirred while being treated with anhydrous hydrogen chloride gas until the temperature of the reaction mixture had increased to 50° C. Heating at the reflux temperature was continued for 5 hrs. after which the reaction mixture was concentrated under reduced pressure. The residue thus obtained was dissolved in a mixture of ether and water, and, after thorough mixing, the ether layer was separated. The ether solution was dried over anhydrous magnesium sulfate, and the ether was removed by evaporation under reduced pressure. Crystallization of the oily residue thus obtained was initiated by scratching the walls of the container. The crystals were separated from some residual oil on a filter, and recrystallized from 95% ethanol. There was thus obtained 4.66 g. (39% yield) of yellow prisms melting at 95° to 98° C. A second recrystallization from 95% ethanol gave 4.10 g. of 2 - butyl - 3,5 - diphenyl - 1,2,6 - (2H) - thiadiazine-1,1-dioxide as yellow tinted prisms melting at 98.5° to 100° C. After a third recrystallization from the same solvent, the compound melted at 99° to 100° C.

*Analysis.*—Calcd. for $C_{19}H_{20}N_2O_2S$: C, 67.03; H, 5.92; N, 8.23; S, 9.42. Found: C, 66.59; H, 5.89; N, 8.19; S, 9.51.

Following the same procedure, but substituting methylsulfamide, ethylsulfamide, and propylsulfamide for butylsulfamide, there were prepared 2-methyl-, 2-ethyl-, and 2 - propyl - 3,5 - diphenyl - 1,2,6 - (2H) - thiadiazine-1,1-dioxide, respectively.

EXAMPLE 8

Following the procedure of Example 2, Part B, but substituting 1,3 - di - (m - chlorophenyl) - 1,3 - propanedione, 1,3-di-(p-methoxyphenyl)-1,3-propanedione, 1-(p-bromophenyl - 3 - (p - methoxyphenyl) - 1,3 - propanedione, 1-(p-bromophenyl)-3-phenyl-1,3-propanedione, 1-(o-methoxyphenyl)-3-phenyl-1,3-propanedione, 1-phenyl-3 - (o - tolyl) - 1,3 - propanedione, 1 - (p - bromophenyl) - 4-phenyl-1,3-butanedione, and 1,4-diphenyl-1,3-butanedione for 1,3-di-(p-tolyl)-1,3-propanedione, there were prepared 3,5-di-(m-chlorophenyl)-1,2,6-(2H)-thiadiazine-1,1 - dioxide, 3,5 - di - (p - methoxyphenyl) - , 3 - (p-bromophenyl) - 5 - (p - methoxyphenyl) - , 3 - (p - bromophenyl) - 5 - phenyl - , 3 - (o - methoxyphenyl) - 5 - phenyl - , 3 - phenyl - 5 - (o - tolyl) - , 3 - (p - bromophenyl)-5-benzyl-, and 3-phenyl-5-benzyl-1,2,6-(2H)-thiadiazine-1,1-dioxide, respectively.

EXAMPLE 9

Following the procedure of Example 4, but substituting 1,3-di-(3-pyridyl)-1,3-propanedione and 1-phenyl-3-(2-pyridyl)-1,3-propanedione for isonicotinoylacetone, there were prepared 3,5-di-(3-pyridyl)-1,2,6-(2H)-thiadiazine-1,1-dioxide and 3-phenyl-5-(2-pyridyl)-1,2,6-(2H)-thiadiazine-1,1-dioxide, respectively.

EXAMPLE 10

Following the procedure of Example 3, but substituting 1-(p-butoxyphenyl)-1,3-butanedione, 1-(p-chlorophenyl)-1,3-butanedione, 1-(p-ethoxyphenyl)-1,3-butonedione, 1-(p - isobutoxyphenyl) - 1,3 - butanedione, 5,5 - dimethyl - 1-phenyl-2,4-hexanedione, 1-phenyl-2-4-hexanedione, and 1,6-diphenyl-2,4-hexanedione for 1-phenyl-2,4-pentanedione, there were prepared 3-(p-butoxyphenyl)-5-methyl-1,2,6-(2H)-thiadiazine-1,1-dioxide, 3-(p-chlorophenyl)-5-methyl-, 3-(p-ethoxyphenyl)-5-methyl-, 3-(p-isobutoxyphenyl) - 5 - methyl - , 3 - benzyl - 5 - tert. butyl - , 5 - benzyl-3-ethyl-, and 5-benzyl-3-phenethyl-1,2,6-(2H)-thiadiazine-1,1-dioxide, respectively.

EXAMPLE 11

2 - chloro - 3,5 - diphenyl - 1,2,6 - (2H) - thiadiazine - 1,1-dioxide can be prepared according to the following procedure:

A solution of 28.4 g. (0.1 mole) of 3,5-diphenyl-1,2,6-(2H)-thiadiazine-1,1-dioxide (Example 1, above) in 300 ml. of dry chloroform is treated with chlorine gas at a temperature of about 0° to 5° C. until the theoretical amount (7.1 g.; 0.1 mole) has been absorbed. The solvent is then removed at about 25° C. under reduced pressure, to obtain 2-chloro-3,5-diphenyl-1,2,6-(2H)-thiadiazine-1,1-dioxide.

I claim:
1. A compound of the structural formula

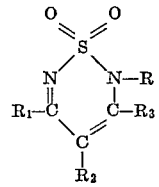

wherein R is selected from the group consisting of hydrogen and lower-alkyl; $R_1$ is selected from the group consisting of phenyl, methylphenyl, halophenyl, lower-alkoxyphenyl, pyridyl, benzyl, and phenethyl; $R_2$ is selected from the group consisting of hydrogen and carbalkoxy of from 2 to 5 carbon atoms, inclusive; and $R_3$ is selected from the group consisting of lower-alkyl, phenyl, methylphenyl, halophenyl, lower-alkoxyphenyl, pyridyl, benzyl, and phenethyl.

2. 3,5-diphenyl-1,2,6-(2H)-thiadiazine-1,1-dioxide.
3. 3,5-di-(p-tolyl)-1,2,6-(2H)-thiadiazine-1,1-dioxide.
4. 3 - lower - alkyl - 5 - benzyl - 1,2,6 - (2H) - thiadiazine-1,1-dioxide.
5. 3 - methyl - 5 - benzyl - 1,2,6 - (2H) - thiadiazine - 1,1-dioxide.
6. 3 - lower - alkyl - 5 - pyridyl - 1,2,6 - (2H) - thiadiazine-1,1-dioxide.
7. 3 - methyl - 5 - (4 - pyridyl) - 1,2,6(2H) - thiadiazine-1,1-dioxide.
8. 3 - methyl - 5 - (3 - pyridyl) - 1,2,6 - (2H) - thiadiazine-1,1-dioxide hydrochloride.
9. 2 - lower - alkyl - 3,5 - diphenyl - 1,2,6 - (2H) - thiadiazine-1,1-dioxide.
10. 2 - butyl - 3,5 - diphenyl - 1,2,6 - (2H) - thiadiazine-1,1-dioxide.
11. Lower - alkyl 3 - lower - alkyl - 5 - phenyl - 1,2,6-(2H)-thiadiazine-1,1-dioxide-4-carboxylate.
12. Ethyl 3 - methyl - 5 - phenyl - 1,2,6 - (2H) - thiadiazine-1,1-dioxide-4-carboxylate.

References Cited by the Examiner

UNITED STATES PATENTS 2,454,262 11/48 Walter _____ 260—243
2,956,997 10/60 Teufel _____ 260—243

FOREIGN PATENTS 1,120,457 12/61 Germany.

OTHER REFERENCES

Degering et al.: "Journal of Orangic Chemistry," vol. 17, pp. 339–341 (1952).

WALTER A. MODANCE, *Primary Examiner.*

NICHOLAS S. RIZZO, JOHN D. RANDOLPH,
*Examiners.*

UNITED STATES PATENT OFFICE
CERTIFICATE OF CORRECTION

Patent No. 3,203,954                                    August 31, 1965

John B. Wright

It is hereby certified that error appears in the above numbered patent requiring correction and that the said Letters Patent should read as corrected below.

Column 2, line 56, for "diazolalkane" read -- diazoalkane --; column 3, line 20, for "-butadiene" read -- -butanedione --; column 4, line 4, for "consitsing" read -- consisting --; line 15, for "1,3-di-p-tolyl)-" read -- 1,3-di-(p-tolyl)- --; line 20, for "1,1,6-(2H)-" read -- 1,2,6-(2H)- --; line 35, for "throughly" read -- thoroughly --; line 65, for "benezene" read -- benzene --; column 6, line 5, for "N, 1587" read -- N, 15.87 --; column 7, line 32, for "-1,3-butonedione" read -- -1,3-butanedione --; line 34, for "2-4-hexanedione" read -- 2,4-hexanedione --.

Signed and sealed this 7th day of June 1966.

(SEAL)
Attest:

ERNEST W. SWIDER                                  EDWARD J. BRENNER
Attesting Officer                                 Commissioner of Patents

UNITED STATES PATENT OFFICE
CERTIFICATE OF CORRECTION

Patent No. 3,203,954                                     August 31, 196

John B. Wright

It is hereby certified that error appears in the above numbered patent requiring correction and that the said Letters Patent should read as corrected below.

Column 2, line 56, for "diazolalkane" read -- diazoalkan --; column 3, line 20, for "-butadiene" read -- -butanedione column 4, line 4, for "consitsing" read -- consisting --; lin 15, for "1,3-di-p-tolyl)-" read -- 1,3-di-(p-tolyl)- --; line 20, for "1,1,6-(2H)-" read -- 1,2,6-(2H)- --; line 35, for "throughly" read -- thoroughly --; line 65, for "benezene" re -- benzene --; column 6, line 5, for "N, 1587" read -- N, 15. --; column 7, line 32, for "-1,3-butonedione" read -- -1,3-butanedione --; line 34, for "2-4-hexanedione" read -- 2,4-hexanedione --.

Signed and sealed this 7th day of June 1966.

(SEAL)
Attest:

ERNEST W. SWIDER                                EDWARD J. BRENNER
Attesting Officer                              Commissioner of Patent